US007306739B1

United States Patent
Camin et al.

(10) Patent No.: US 7,306,739 B1
(45) Date of Patent: Dec. 11, 2007

(54) POTATO WASTEWATER TREATMENT METHOD USING A STARCH-COMPLEXING EMULSIFIER

(75) Inventors: Henry J. Camin, Pocatello, ID (US); Stephen R. Goodson, Shelley, ID (US)

(73) Assignee: Basic American, Inc., San Francisco, CA (US)

( * ) Notice: Subject to any disclaimer, the term of this patent is extended or adjusted under 35 U.S.C. 154(b) by 642 days.

(21) Appl. No.: 10/822,150

(22) Filed: Apr. 8, 2004

(51) Int. Cl.
*C02F 1/00* (2006.01)
*C02F 1/44* (2006.01)
(52) U.S. Cl. ............... 210/723; 210/728; 210/767
(58) Field of Classification Search ............... 210/723, 210/728, 767
See application file for complete search history.

(56) References Cited

U.S. PATENT DOCUMENTS 6,555,003 B2  4/2003  Ferro et al.

2003/0170363 A1* 9/2003 Rousset et al. ............. 426/457

OTHER PUBLICATIONS

Gonzalez, J.M., et al., *Food Hydrocolloids*, vol. 4, No. 5. 355-363, 1991.

* cited by examiner

*Primary Examiner*—Chester T. Barry
(74) *Attorney, Agent, or Firm*—Morgan, Lewis & Bockius LLP; David J. Brezner

(57) ABSTRACT

A method comprising treating a potato wastewater stream containing suspended free starch particles with a potato starch-complexing emulsifier to form agglomerated starch particle-emulsifier complexes, and separating the complexes from the remainder of said wastewater stream. Also the separated starch complex suitable for human or animal consumption alone or in combination with other food ingredients. In various embodiments, the products comprise (a) at least about 2000 mg/100 g, BDS, glutamic acid; and/or (b) at least about 2500 mg/100 g, BDS, aspartic acid; and/or (c) at least about 10 g/100 g, BDS, total protein.

10 Claims, 1 Drawing Sheet

POTATO WASTEWATER TREATMENT METHOD USING A STARCH-COMPLEXING EMULSIFIER

BACKGROUND OF THE INVENTION

In potato processing operations such as used in the dehydration of potatoes, water flows through various cookers, pre-cookers, blanchers, and transport systems. The overflow or effluent water from such processing operations is called potato wastewater or potato water. Such potato wastewater is difficult to filter due to dissolved starch which tends to block screens in the filtration equipment. Various regulatory agencies are instituting stricter standards for the disposal of such wastewater. Accordingly, there is a need to reduce the potato solids in such wastewater and to recover the solids as a usable byproduct.

One potato wastewater treatment method for this purpose is disclosed in Ferro, et al. U.S. Pat. No. 6,555,003 (the '003 patent). There, the wastewater stream is treated with an alpha amylase enzyme to hydrolyze starch in the wastewater followed by ultra-filtration of the enzyme-treated wastewater to filter and remove suspended solids in a first concentrate stream followed by reverse osmosis-filtering of the ultra-filter permeate. However, there are disadvantages with the presence of the enzymes as an impurity in the concentrate for certain uses. Further, the most efficient use of certain enzymes may require the energy cost of heating the wastewater to the optimum effective range for the enzyme.

Another approach to the recovery of protein from potato wastewater streams is described in Gonzalez, J. M., et al., Food Hydrocolloids, Vol. 4, No. 5, pp 355-363, 1991. There, a hydrocolloid, specifically carboxy methyl cellulose (CMC), is stated to be used as a complexing agent. That paper also describes the use of pH adjustment and an added electrolyte which it states to be inferior to the use of CMC in that it is stated to be difficult to separate coagulated protein due to low sedimentation rates and poor filter ability.

Thus, there is a need to reduce the potato solids in potato wastewater and to recover the solids as a usable byproduct, particularly one useful as an ingredient for foods for human, animal, or microbiological consumption.

It is an objective of the invention to provide a method for treating potato wastewater and to provide a byproduct of such treatment suitable for use as an ingredient for food for human, animal, or microbiological consumption.

SUMMARY OF THE INVENTION

One embodiment is a method comprising (a) treating a potato wastewater stream containing suspended free starch particles with a potato starch-complexing emulsifier to form starch particle-emulsifier complexes, and (b) separating at least part of the complexes from the remainder of said wastewater stream.

Another embodiment is the separated complex of the above method in a form suitable for human or animal consumption alone or in combination with other food ingredients. In various embodiments, the products comprise (a) at least about 2000 mg/100 g, BDS, glutamic acid; and/or (b) at least about 2500 mg/100 g, BDS, aspartic acid; and/or (c) at least about 10 g/100 g, BDS, total protein.

DETAILED DESCRIPTION OF THE PREFERRED EMBODIMENTS

Figure 1:
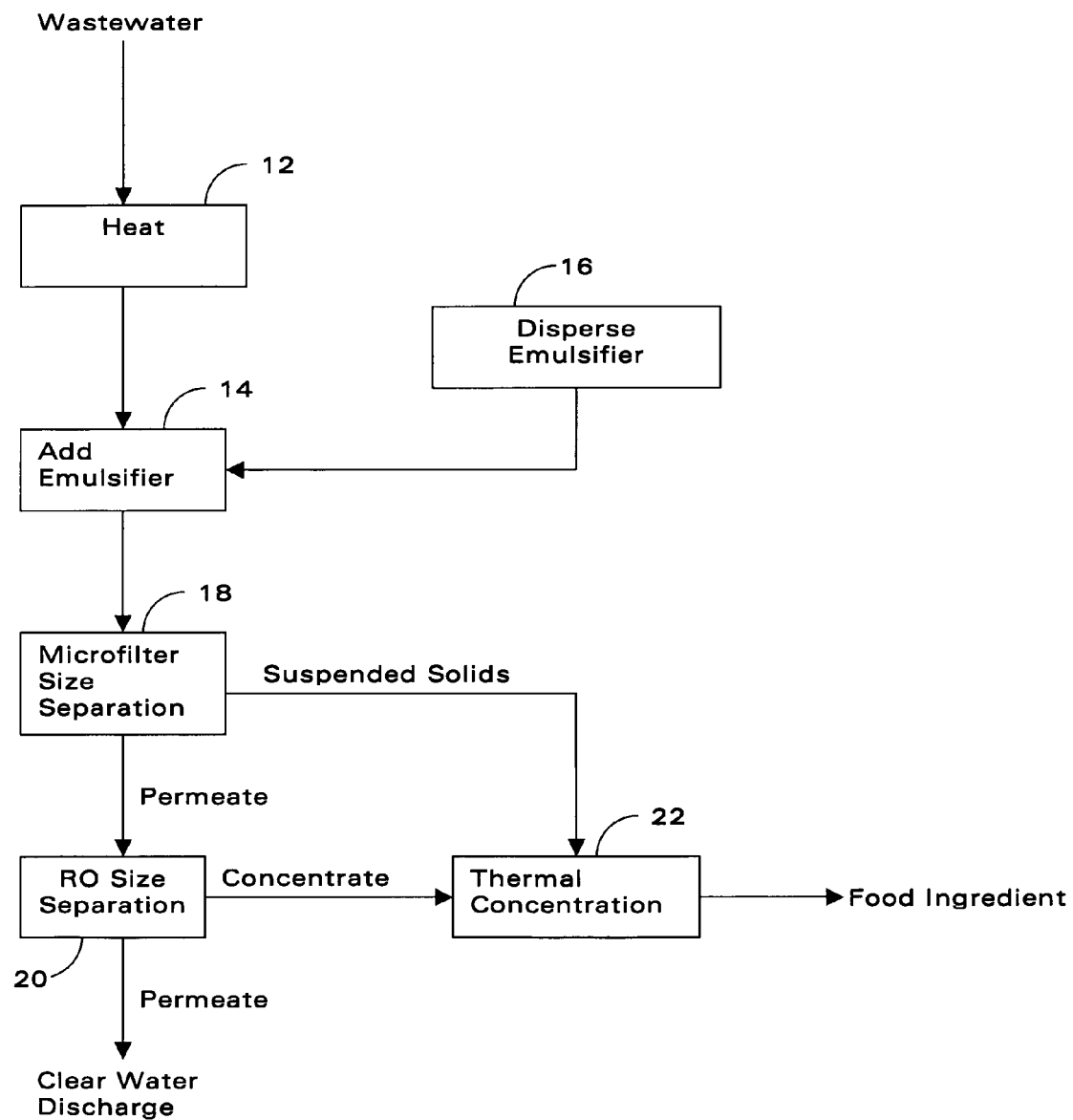
FIG. 1 is a schematic flow diagram illustrating a method according to the present invention.

In accordance with one embodiment of the present invention, a method is provided for treating potato wastewater which includes the steps of treating the wastewater with a potato starch-complexing emulsifier to form a starch particle-emulsifier complex in agglomerate form, and then separating the agglomerates from the wastewater stream. As used herein, the terms "potato wastewater" or "potato water" have the same meaning as used in the potato processing industry. In general, the terms include the aqueous liquid effluent from unit operations in a potato processing plant (e.g., cookers, pre-cookers, blanchers, and transport systems). For example, potato wastewater can be the effluent from unit operations in the making of dehydrated potato products, e.g., potato flakes, potato granules, slices and dices. Typically, the wastewater is composed of dissolved and undissolved starch, sugar, fiber, protein, fat, and minerals, containing about 0.5 to 2% by weight of total potato solids, about 0.1% which is suspended solids.

The process will be described with respect to the flow diagram of FIG. 1. Typically, the wastewater first is subjected to a rough screening (not shown) as described in the '003 patent to remove coarse solids.

Referring to Step 12, the wastewater preferably is heated if it is not at the desired temperature for treatment with emulsifier. As set forth above, the wastewater typically is collected from the pre-cooking, cooling, final cooking, slicing, and/or transport operations in a potato processing plant and may be mixed into a single aggregate stream. Depending upon the plant operation, the wastewater to be treated is at an elevated temperature, generally a mixture of streams of 90° F.-190° F., typically resulting in an aggregate temperature of about 110° F. to 160° F., more specifically about 135° F., at a pH of about 5.5 to 6.3. In a preferred embodiment, the wastewater stream is at the optimum temperature for the emulsifier activity when the emulsifier is added. As set forth below, for typical emulsifiers this temperature is typically between 140° F.-165° F., preferably 145° F.-150° F. If the wastewater temperature is below this temperature, it is preferably heated to this temperature by direct injection of steam or some other method of heating. If the wastewater is already at the desired temperature, no preheating is used.

In Step 14, the wastewater stream is treated with a potato starch-complexing emulsifier to form an agglomerated starch particle-emulsifier complex (herein, "the complex"). The emulsifier serves as a flocculant to agglomerate the starch particles into clumps (e.g., at least 10 microns in size) which facilitates physical separation from the wastewater stream.

Any of the well-known food grade emulsifiers may be used. Suitable emulsifiers include monoglycerides, mixtures of mono- and diglycerides, and derivatives thereof, including DATEM (diacetyl tartaric acid esters of mono- and diglycerides) and polysorbates. Emulsifiers such as mono- and di-glycerides (e.g., Dimodan PV manufactured by Danisco USA Inc.), and/or DATEM (e.g. Panodan 150K manufactured by Danisco USA Inc.) assist in complexing of free starch. Mono-& diglycerides derived from either vegetable or animal fats typically consist of a mixture of predominantly saturated acyl fatty acids including lauric, palmitic, stearic, myristic in combination with unsaturated acyl fatty acids, including oleic, eladic, linoleic and combinations thereof. Mono- and diglyceride emulsifiers typically have a monoglyceride content greater than 40%, preferably greater than 60% and most preferably greater than 90%. In the production of monoglycerides, a triglyceride normally is reacted with glycerol to form a mixture of mono and diglycerides. This process can be carried further to isolate or to concentrate the monoglyceride fraction by molecular distillation. The remaining components, predominantly di & triglycerides, are typically recycled back to the reaction with glycerol to make additional monoglyceride.

In one embodiment, an emulsifier-water mixture, typically in the form of an emulsion or cream, is first prepared in Step 16 by mixing one or more emulsifiers (e.g., mono-diglycerides) in water at a suitable concentration of 3% to 15% or more, preferably 5% to 10%, more preferably about 6%-8%, and typically about 8% in water. The emulsifier preferably is mixed at an elevated temperature, say from 150° F. to 170° F., preferably 155° F. to 165° F. to disperse the emulsifier, which typically is in solid form, in the hot water. Mixing may be performed by mechanical agitation or any other suitable means.

In Step 14, the aqueous dispersion of the emulsifier is added to the wastewater. A sufficient amount of emulsifier is added to form the desired concentration of the agglomerated starch particle-emulsifier complex for subsequent separation. Suitably, the emulsifier is added at a concentration of at least about 0.1%, 0.3%, 0.5%, 1.0%, 1.5%, 2.0%, or more by weight of the total solids content on a bone dry solids basis (BDS) in the potato wastewater stream.

The emulsifier may be considered to be a flocculant which causes the suspended starch particles to agglomerate or precipitate into larger separate particles, termed "complexes," which are more easy to separate from the process stream. Typically, the complexing reaction is almost instantaneous, taking less than about 1 minute to 10 seconds or less. Thus, the emulsifier can be added inline in a continuous flowing wastewater stream in a conduit. Sufficient mixing should be provided for substantially uniform distribution of the emulsifier in the wastewater. One method to accomplish this is to add the emulsifier to the wastewater flow prior to a pump.

The emulsifier-complexed starch can be separated from the main wastewater stream by any of a number of different separation techniques including filtration, density separation, or combinations of such separation techniques. A suitable separation scheme is illustrated in the '003 patent, incorporated herein by reference.

As used herein, the terms "separated potato starch complex" or "complex" or "byproduct" or "product of the invention" or variants thereof refer to part or substantially all of the complex in the wastewater stream which is separated from the remainder of the wastewater stream. It should be understood that some of the complex may remain in the wastewater from which the separated complex is removed. The term "complex" encompasses not only the potato product in the form as separated but also the complex after subsequent treatment, as by drying, or subsequently mixed with other products, whether or not the "complex" remains in a complex form. Thus, as used herein, the above terms refer to the separated complex, further processed or not, in any form, alone or in combination with other products, typically food products.

In the separation scheme illustrated in FIG. 1, the wastewater stream from Step 14 is passed to a typical separation operation. As illustrated, the wastewater stream may be passed to a microfilter size separator 18 in which the starch complex agglomerates in a suspension or slurry are separated by size using a microfilter, suitably by ultra filtration as described in the '003 patent. The suspended solids stream from separator 18 may be directed to a concentrator, suitably a thermal concentrator such as an evaporator 22, e.g., as illustrated in the '003 patent. The permeate or dissolved solids may be directed to a size separation device, suitably a reverse osmosis (RO) unit 20. Suitable parameters for the reverse osmosis unit and conditions are set forth in the '003 patent. The permeate from the RO unit 20 may be directed to waste as a clear water discharge.

The concentrated dissolved solids from the RO unit 20 may be mixed prior to or in evaporation unit 22 for further concentration by evaporation. The product exiting the final concentrator evaporator typically contains as high as 20 to 40% solids, more preferably at least about 30 to 40% solids and may be as high as 50-60% solids or more. The end product of evaporation is a byproduct of the wastewater stream which can be used as a food ingredient for human, animal, or microbiological consumption alone or in combination with other food ingredients as will be described below. The product may be used in the concentrate form exiting from the evaporator, or may be stabilized as by drying, e.g., to a dry powder depending on the desired use of the product.

In contrast to other processes for treating potato wastewater, it is not necessary to add extraneous enzyme or hydrocolloid during the process and so, preferably, no substantial amount of these "added" ingredients, i.e. ones not already present in the wastewater, is present in the concentrated byproduct. Further, the method preferably id performed in the substantial absence of pH adjustment by adding electrolyte, e.g. acid or base, to the process. Thus, in one embodiment of the invention, the end product includes no, or no substantial amount of, added active free enzyme, hydrocolloid, or intentionally added electrolyte (other than a flavoring ingredient) as do the wastewater treatment byproducts suggested in the prior art.

Other schemes for separating the starch complex and concentrating into a form suitable for use as a food additive may be employed as well.

In other embodiments of the present invention, the complex made by the above method, which is useful as a food for human or animal consumption, has one or more levels of the following constituents.

In one embodiment the product has at least about 2000 mg/100 g, BDS, of glutamic acid or preferably at least about 2500, 3000, 3500, 4000, 4500, 5000 or more mg/100 g.

In another embodiment, the product includes at least about 2500 mg/100 g, BDS, of aspartic acid, preferably at least 3000, 3500, 4000, 4500, 5000, 5500, 6000, 6500 or more.

In a further embodiment, the product includes a high protein content such as at least about 10 g/100 g, BDS, total protein, preferably at least 15, 18, 22, 24, 26 g or more per 100 g, BDS.

In yet another embodiment, the product includes at least 1500 mg/100 g, BDS, of potassium, preferably, for some applications such as to react with proteins in meat products, at least 2000, 2500, 3000, 3500, 4000, 4500, 5000, 5500, 6000 and 6500 or more.

Another characteristic of the product which may be useful for some applications is that it typically has a starch content such as less than 70 g/100 g, BDS, 65 g/100 g, 60 g/100 g, 55 g/100 g, or 50 g/100 g.

The foregoing level of specific constituents of the product refer to the separated potato starch complexes at the time of separation. If the separated complexes are mixed with other food materials, the amount of the recited components in the total mixture will be modified.

The product of the present invention, being a natural extract of potatoes, contains constituents that provide functional benefits. Of particular interest are the levels of protein, hydrolyzed protein, glutamic acid, aspartic acid, starch, fiber, and naturally occurring antioxidants. The product typically contains high levels of savory flavor enhancers, such as hydrolyzed protein and the amino acids, glutamic acid and aspartic acid. For many years, monosodium glutamate (MSG) and associated ingredients (e.g. hydrolyzed vegetable protein, yeast hydrolysate, etc) have been used as food additives to enhance savory flavors in foods. However, one issue with these ingredients is that they are often produced from soybeans or soybean products, which have been implicated as allergens. Therefore, a market need is developing for food additives such as the product of the present invention, which enhance savory flavors, but without the allergen risks associated with soy-based ingredients. As such, it can be used to enhance these flavors in a variety of food products where MSG is currently used, such as ground meats, restructured meat products, seafoods, vegetables, Asian foods (e.g., Chinese, Japanese, That, Korean, and Vietnamese foods) and the like.

When used as an additive in food products, the present product typically provides the additional functional benefits of water binding and fat binding. These functional benefits improve freeze-thaw stability of frozen foods, increase cook yield in products where water or fat drip occurs (e.g. hamburger), etc. It appears that the starch, fiber, and/or protein that are contained in potato extracts and any additional ingredients may be associated with these improved functional properties.

The present product also provides antioxidant properties which improve the storage life in lipid-containing food products. These benefits are particularly advantageous when extracts are used as a natural additive in precooked ground beef patties to reduce "warmed-over-flavor" characteristics.

In addition to applications in human food products, the present product can be used as a nutrient source for microorganisms. Constituents in potato extracts (such as protein, amino acids, carbohydrates, and minerals) are of particular interest in providing nutritional value to enhance the growth of microorganisms.

The present product can also be used to meet the needs of the animal feed industry such as large animal feeds, pet foods, and feed flavorings. Regarding pet foods and large animal feeds, potato extracts are suitable for incorporation into formulations where the nutrition and flavor benefits (e.g. protein, amino acids, fiber, carbohydrates, minerals, pyrazines, etc.) add value. The natural antioxidants in the product will also enhance shelf life of these animal feed products.

Regarding applications such as pet food flavorings, the present product is suitable for incorporation directly into formulations, or as a substrate for further processing to hydrolyze proteins. These flavoring compounds can be added to bulk feeds by any means, such as enrobing. Key constituents for application as a flavoring are the proteins, hydrolyzed proteins, amino acids, and pyrazines.

In order to provide potato extracts in a user-friendly form, it may be desirable to stabilize the product (i.e. enhance its shelf-stability) through any traditional approach such as dehydration, acidification, thermal processing, reduced water activity, refrigeration, and the like. For example, if desired for particular uses, e.g., as a food additive for human or animal consumption, the product may be further processed, e.g. by drying to any suitable form, such as a spray-dried powder, agglomerated particulate, etc.

As used herein, the terms "mixing" or "mixture" or variants thereof refer to an end product which includes the separated complex (in complex form or not) and other ingredients suitable for food for humans, animals or microbiological organisms (e.g., in microbiological media).

It may take the form of mixing the wet concentrate from Step 22 or the like with a wet ingredient such as potato mash which is subsequently drum dried to a potato flake-like product. Alternatively, the wet concentrate may be added to a product such as ground meat. Further, the wet concentrate may be used as an enrobing agent or coating onto a dry product such as potato granules. Further, the dried complex in particulate form may be mixed with other products which may be dry (e.g. potato flakes or granules) or wet (e.g. ground beef).

The high protein byproduct of the present invention in a liquid concentrate or dried form may be added to any of a wide variety of food products as a high protein additive. Suitable products for admixture with the stated products of the present invention include comminuted or uncomminuted foods including ground meats, such as ground beef, ground poultry products (chicken, turkey, etc), comminuted seafood (e.g. fish), restructured meats, restructured seafood, surimi, Asian foods, meat and seafood analogs, rice products, grain products, vegetables and vegetable products, vegi burgers, legumes and legume products, beans and bean products, potatoes and potato products, nutritionally enhanced products, marinades, soups, stews, and the like. Suitable concentrations of the byproduct solids into "as-is" ground meat are from about 0.05% to 15.0%, preferably, 0.5% to 5.0%. As used herein, the term "as is" means a percentage based on the total weight of the combined product including water content.

In a specific application, the starch complex potato byproduct of the present invention may be added in liquid concentrate or dry form to other potato products, for example, potato flakes and potato granules. This could be accomplished by adding the product as an addback during the processing in the plant from which the potato wastewater is generated. The byproduct could be added as a liquid concentrate to a potato slurry which is then drum-dried to make potato flakes. The amounts of the foregoing components will be different in these end products compared to the starch complexes prior to addition.

Suitable concentrations of the product may vary over a wide range. It could be used at a level as low as 0.05 g solids per 100 g or less compared to the food ingredients, as is, with which it is mixed. It is typically used at a level of at least 0.1% to 5.0% to as high as 15%, depending upon the desirable properties that it brings to the end product. The upper limit is a level at which the product could alter the desired flavor or other characteristics of the food product to which it is added. One example is adding the byproduct to a ground meat product suitably at a level of at least 50 to 15,000 mg of potato product solids per 100 g (as is weight) of raw ground meat.

In order to illustrate the nature of the present invention, examples of its practice are provided.

EXAMPLE 1

Potato water at a rate of 100 gpm entered a Lyco Drum screener. The screener removed large chunks, skins and other macro size potato pieces from this incoming liquid. The temperature of this stream was about 138° F. After screening, the liquid was pumped through a separator to remove sand and silt. The pressure varied between 30 and 50 psig. A small amount (less than 0.1-0.3 gal./min.) (gpm)) of process liquor was exhausted from the separator during this step to flush away the grit.

After this initial screening and centrifugal separation, the liquid now contained approximately 1.0% total solids and about 0.1% of that total was suspended solids. The temperature had decreased to about 135° F. In order to prepare the potato water for emulsifier processing, the temperature was raised to 145° F. using direct steam injection (a heat exchanger can also be used). The hot liquid was pumped into one of two 20,000 gallon storage tanks. An emulsifier slurry was premixed where 30 lbs. of Danisco Dimodan emulsifier was mixed into 30 gallon of water at 150° F. This slurry was metered into the hot potato water stream as it was pumped into the storage tanks at a rate of 150 ml/minute.

The potato process water was then ultra-filtered using Graver Stainless Steel Ultra-filtration elements. The unit operated at 20 psig feed pressure and 145° F. 100 gpm was concentrated to 7 gpm. This concentrate stream contained suspended solids as well as dissolved solids. The total solids for this stream was 2.5% [(0.1%×15)+1.0%=2.5%]. The permeate from this operation was generally clear with a pale yellowish color. The flow rate of the permeate stream was 93 gpm.

The permeate from the ultra-filter was further filtered using a food grade reverse osmosis system constructed by Niro, Inc. The filter concentrated the liquid from 93 gpm to 18 gpm. This was a 5.16 concentration ratio therefore the solids increased from 1.0% to 5.2% This unit was operated at less than 200 psig and 173° F. The filter elements in this example were of the high temperature type with a fiberglass outer wrap for added structural integrity. They were constructed by PTI-AMT, Inc. The permeate from this stream was clear, contained little COD loading and could re-enter a waste treatment system or be used as cleaning water.

The concentrate from the reverse osmosis unit was combined with the concentrate from the ultra-filtration unit and fed into an evaporator for further concentration. Seven gallons per minute from the UF combined with 18 gpm from the RO to provide a 25 gpm evaporator feed stream at 160° F. with solids of about 5%.

The above combined stream was concentrated further using a four effect rising film evaporator, (Sigma Star, API Schmidt-Bretten). The liquid exited this process with a total solids content between 30 and 40%.

EXAMPLE 2

A product made by the process of claim 1 analyzed as follows.

| Analysis of Wet Product reported on a bone dry solids (BDS) basis | |
| --- | --- |
| Glutamic Acid (mg/100 g, BDS basis) | 4,910 |
| Aspartic Acid (mg/100 g, BDS basis) | 6,420 |
| Protein (g/100 g, BDS basis) | 24.0 |
| Potassium (mg/100 g, BDS basis) | 6,590 |
| Dietary Fiber (g/100 g, BDS basis) | 3.6 |
| Starch (g/100 g, BDS basis) | 43. |

EXAMPLE 3

The product of the type illustrated in Example 2 made by the method of claim 1 was used to produce an enhanced dehydrated potato flake. To produce this product, peeled potatoes were metered to a potato flake processing line at a rate of 55 lbs./minute. These potatoes were processed in the cook, cool, cook conditions typical for flake processing. Following the final cook step, 30% solids potato concentrate (from Example 1) was metered into the cooked potato flow at a rate of 6.8 lbs./minute. This combined stream was then pumped to a size reduction system and distributed by gravity onto a drum dryer where it was dried into a sheeted material. These sheets were then ground.

EXAMPLE 4

The product of the type illustrated in Example 3 made by the method of claim 1 (a dehydrated potato flake wherein 17% of the solids were from the ingredient of the present invention) was mixed with ground beef (20% fat) and cooked to 70° C. internal temperature. The potato ingredient was added as a flavor enhancer, and to improve cooked yield. The amount of potato ingredient added was varied from 0% (i.e. the control product) to 10% on a weight basis.

The % cooked yield was then measured (weight of finished cooked meat÷weight of starting raw meat×100). The data shown below indicated that the cooked yield increased as the amount of potato ingredient also increased. This indicated the ability of the added potato ingredient from Example 3 to bind liquid and increase the as-served yield of ground beef.

| Amount of Potato Ingredient Added | % Cooked Yield |
| --- | --- |
| 0% (w/w) | 72.5 |
| 2% | 82.3 |
| 5% | 88.6 |
| 10% | 93.5 |

EXAMPLE 5

The product of the type illustrated in Example 3 made by the method of claim 1 (a dehydrated potato flake wherein 17% of the solids were from the ingredient of the present invention) was mixed with low-fat ground beef (approximately 5% fat), 10% water, and various amounts of the potato ingredient. The potato ingredient was added as a flavor enhancer, to improve cooked yield, and to reduce the development of oxidative rancidity. Samples of these products were used for freeze-thaw testing and lipid oxidation testing.

For the freeze-thaw testing, samples (20 grams) of this admixture were formed, frozen and thawed through four (4) freeze-thaw cycles. The amount of potato ingredient added was varied from 0% (i.e. the control product), to 2%, to 5%, and to 8% on a weight basis. The amount of drip liquid was collected and measured following each freeze-thaw cycle. A total of 2.65 grams of drip was collected from all the freeze-thaw cycles from the control sample which contained no added potato ingredient. No drip was observed from any of the test samples containing 2,5, or 8% added potato ingredient. This indicated the ability of the added potato ingredient to bind liquid in water-added ground meat products that might experience freeze-thaw abuse.

For the lipid-oxidation testing, a Test Product (a mixture containing 5% added potato ingredient of Example 3) was compared to a Control Product containing no added potato ingredient. In this test, the ground beef samples were cooked to 70° C. internal temperature, held for 5 min, cooled to 4° C., and then placed in sealed containers. The measurement of lipid oxidation utilized the thiobarbituric acid (TBA) test of Tarladgis et al., *J. Sci. Food Agriculture* 15: 602-607 (1964) wherein lipid oxidation can be expressed as the TBA number or as mg malonaldehyde/kg meat. Lipid oxidation was then measured in the ground beef samples after cooking and up to 5 days after cooking and refrigerated holding. The data shown below demonstrate that the sample containing the potato ingredient demonstrated a slower rate of increase in TBA number which suggests that the potato ingredient exhibits antioxidant properties.

| TBA number (mg malonaldehyde/kg meat) | | |
| --- | --- | --- |
| | Raw meat | 1 day after cooking | 5 days after cooking |
| Control Product | 2.54 | 6.89 | 17.20 |
| Test Product | | 3.89 | 6.85 |

What is claimed is:

1. A method of treating potato wastewater comprising the steps of:
   (a) treating a potato wastewater stream containing suspended free starch particles with a potato starch-complexing emulsifier to form starch particle-emulsifier complexes, and
   (b) separating at least part of said complexes from the remainder of said wastewater stream.

2. The method of claim 1 wherein said separating is performed by a separation method selected from the group consisting of filtration, density separation, and combinations thereof.

3. The method of claim 1 in which said separated complexes, with or without further treatment, are mixed with a food for human or animal consumption.

4. The method of claim 1 in which said separated complexes, with or without further treatment, are mixed with microbiological growth media.

5. The method of claim 1 in which said emulsifier is selected from the group consisting of monoglycerides, diglycerides, and mixtures and derivatives thereof.

6. The method of claim 1 in which said emulsifier in step (a) comprises at least about 0.1% by weight of the total solids content, BDS, in the potato wastewater stream.

7. The method of claim 1 further comprising stabilizing said separate agglomerates.

8. The method of claim 1 performed in the substantial absence of added enzyme.

9. The method of claim 1 performed in the substantial absence of added hydrocolloid.

10. The method of claim 1 performed in the substantial absence of pH adjustment.

* * * * *